US005465939A

United States Patent [19]

Sell

[11] Patent Number: 5,465,939

[45] Date of Patent: Nov. 14, 1995

[54] DIRECTIONAL CONTROL ASSEMBLY FOR AN AIR WINCH

[75] Inventor: Leslie J. Sell, Bothell, Wash.

[73] Assignee: Ingersoll-Rand Company, Woodcliff Lake, N.J.

[21] Appl. No.: 141,836

[22] Filed: Oct. 22, 1993

[51] Int. Cl.$^{6}$ .............................. B66D 1/48; B66D 1/10; F16K 31/44

[52] U.S. Cl. .................... 254/276; 137/614.19; 251/213; 251/294; 251/229; 254/360

[58] Field of Search .................................... 254/276, 268, 254/314, 360; 137/636.1, 614.19; 251/213, 294, 249.5, 229; 91/2

[56] References Cited

U.S. PATENT DOCUMENTS

| | | | |
|---|---|---|---|
| 1,486,923 | 3/1924 | Ross | 254/276 X |
| 2,064,051 | 12/1936 | Allard | 91/2 |
| 2,827,880 | 3/1958 | Shaff | 137/636.1 |
| 3,301,532 | 1/1967 | Lock et al. | 254/360 X |
| 3,365,175 | 1/1968 | Pompiliu et al. | 254/276 |
| 3,502,301 | 3/1970 | Davis et al. | 254/276 |
| 3,934,856 | 1/1976 | Shaw | 254/276 X |
| 3,960,362 | 6/1976 | Griffiths et al. | 254/276 |
| 4,827,982 | 5/1989 | Inagaki | 137/636.1 |

FOREIGN PATENT DOCUMENTS

| | | | |
|---|---|---|---|
| 83/03087 | 9/1983 | WIPO | 254/276 |

*Primary Examiner*—Daniel P. Stodola
*Assistant Examiner*—Michael R. Mansen
*Attorney, Agent, or Firm*—Walter C. Vliet

[57] ABSTRACT

A mechanical limit control device for adjustably halting the operation of a winch at preset points including a proportionally driven flexible cog belt providing a compact conformable configuration having projections which operate a snap action air valve to limit the deployment extent of a pneumatically operated winch.

13 Claims, 4 Drawing Sheets

DIRECTIONAL CONTROL ASSEMBLY FOR AN AIR WINCH

BACKGROUND OF THE INVENTION

This invention relates generally to directional control devices for winches and, more particularly, to a mechanical limit device for adjustably halting the operation of a winch at a preset point in the machine cycle.

A mechanical limit device can be generally described as a device that halts the operation of a machine at a preset point in the machine's cycle and prevents further operation until the device is reset by some action. A device of this type is often used on a winch to limit the raising and lowering point extent of a load. Once the limit has been reached, the operator would normally be required to reverse the winch for a certain distance in order to reset the device.

Two common types of mechanical device in current use today are either rotary or linear devices driven through gear reduction by the machine. Rotary devices are geared to track the movement of the machine in less than one revolution of a cam which is used to activate a switch to turn off the machine. Similarly, a linear device is geared to track the movement of the machine by employing a threaded nut traveling along a lead screw to activate a switch. The closer the tracking movement is to the movement of the machine, the greater will be the accuracy of the device and this determines the exact stopping point at each preset limit and the minimum operating distance between the limits. For increased tracking movement, it is desirable to make the cam in a rotary device as large a diameter as possible and the lead screw in a linear device as long as possible. Rotary devices are generally preferred since they will continue to rotate beyond one revolution should the switch fail to stop the machine as intended. If the switch on a linear device should fail to stop the machine, the traveling nut will eventually reach the end of the lead screw. At this point it must disengage to avoid damage to the components. Once disengaged, it will require retiming before it can function again.

The foregoing illustrates limitations known to exist in present devices and methods. Thus, it is apparent that, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a directional control assembly comprising a means for producing a first signal of a ratioed position indicating proportionality; a means for producing a second signal indicative of an adjustable preset limit of the first signal; and the means for producing the first signal further comprising an endless belt.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
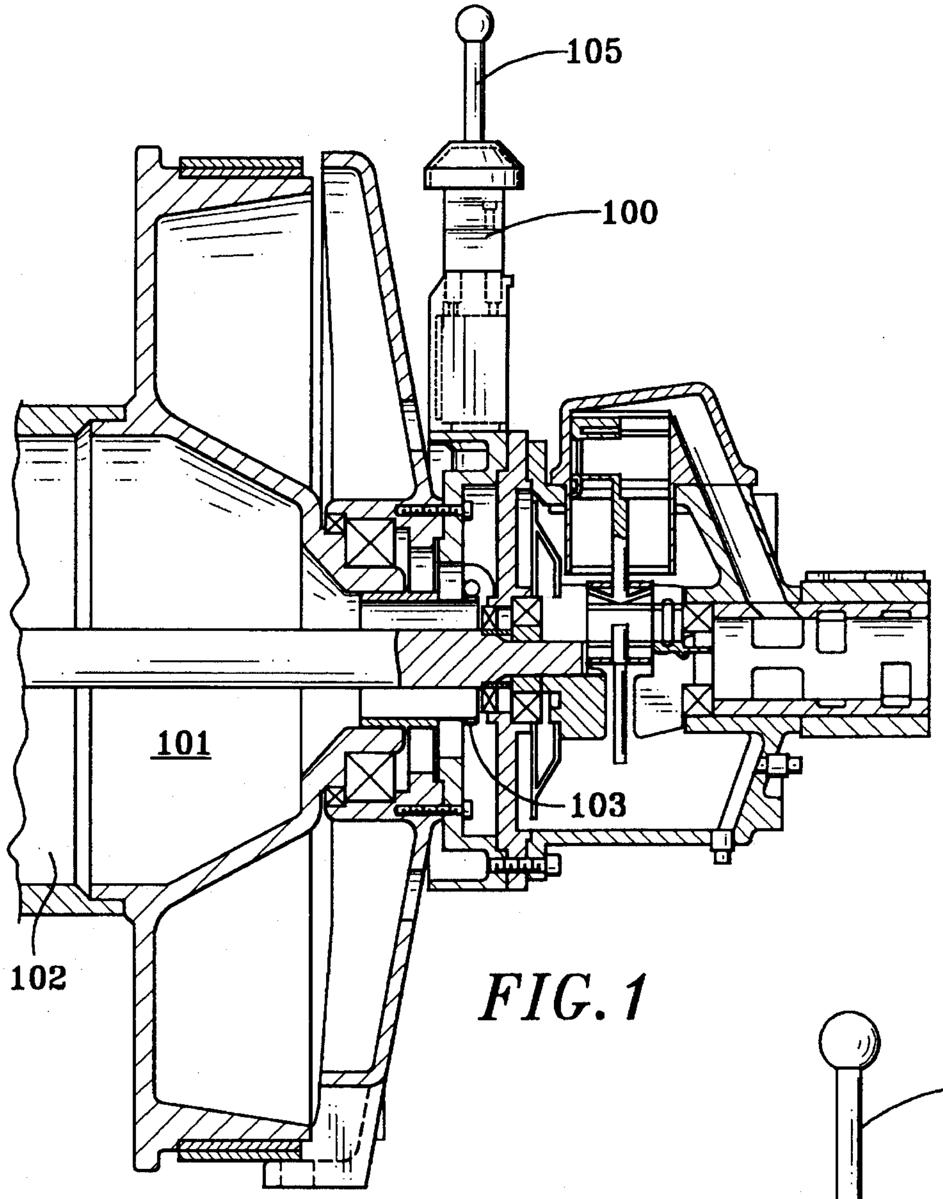
FIG. 1 is a cross sectional view of an air operated winch.

Referring to FIG. 1, the limit device and directional control valve assembly 100 according to the present invention are mounted on a winch partially shown and generally indicated by the reference numeral 101 as shown. The rotation of the winch drum 102 is transferred at reduced rate through spiral gear 103 and drive shaft 13 (best seen in FIG. 6) to worm 116 to worm gear 11 (best seen in FIG. 4) in the limit device. Actuation of the directional control valve 100 causes the winch drum 102 to turn and the drive belts in the limit device to turn at reduced rate.

Figure 6:
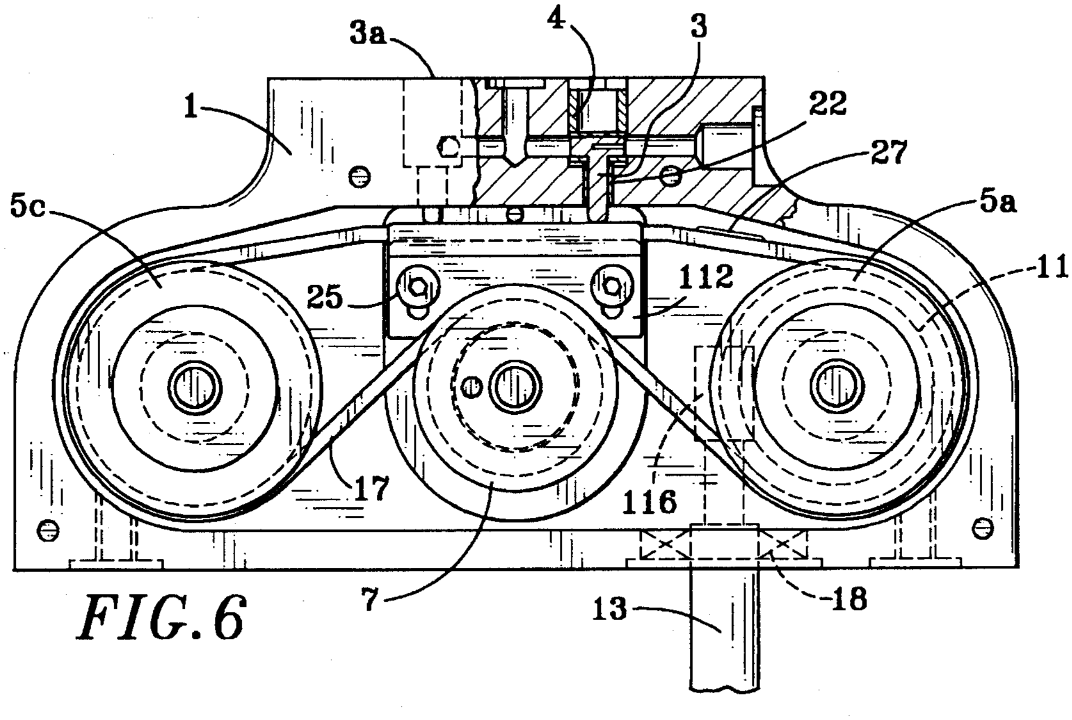
FIG. 6 is an expanded cross sectional view showing the details of the endless belts and coacting poppet assembly.
Figure 7:
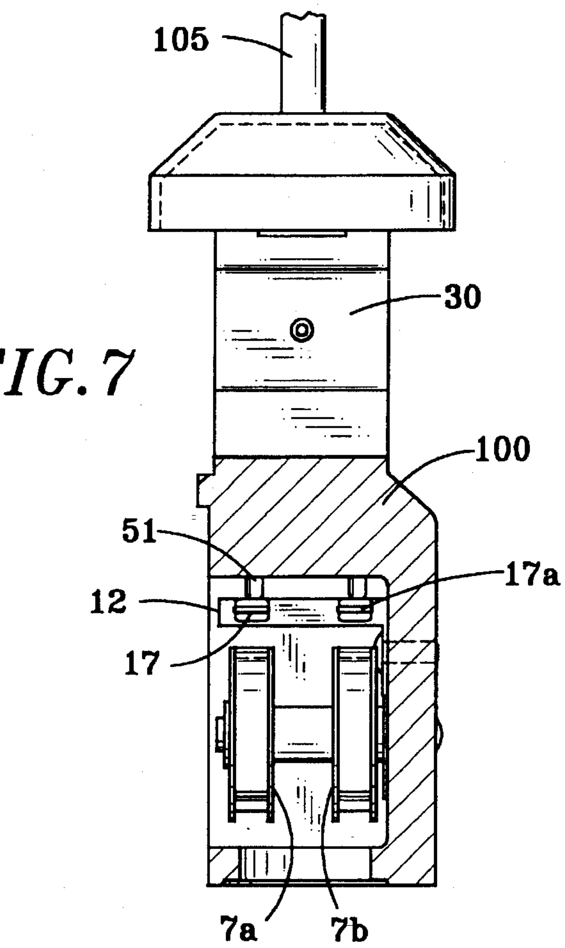
FIG. 7 is a partial cross section view of the control valve taken at Section 7—7 of FIG. 3.
Figure 8:
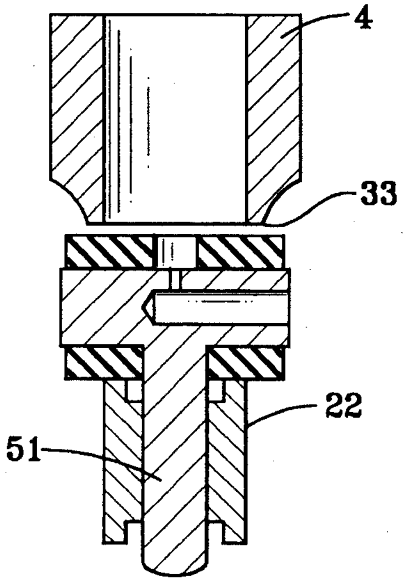
FIG. 8 is a cross sectional detail of the poppet valve assembly.
Figure 9:
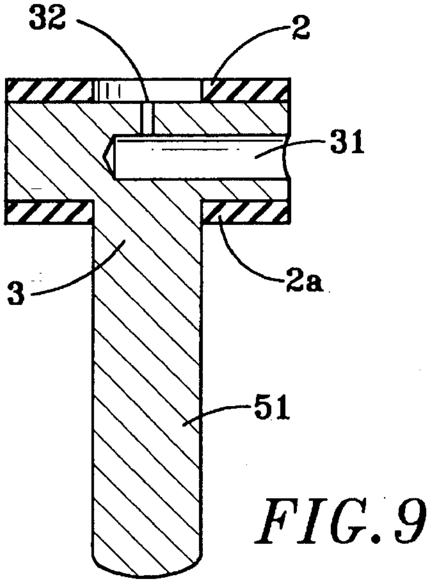
FIG. 9 is an expanded cross sectional detail of the poppet.

Referring to FIGS. 1 and 6, the winch drum 102 will continue to turn until a raised portion 27 on the appropriate dual belt drive belt 17 or **17*a* in the limit device passes over support guide 112 and lifts the poppet 51** aligned with that belt. This will cause the air valve to snap close and stop the winch drum. Counterclockwise rotation of the winch drum for approximately one revolution will reset the air valve. Counterclockwise drum rotation will be restricted in the same manner by the opposite belt and air valve in the limit device.

Figure 4:
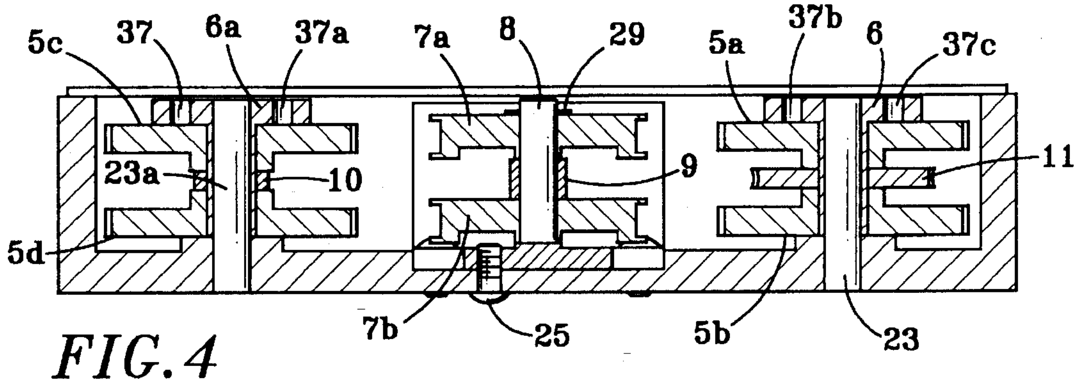
FIG. 4 is a cross sectional view of the control unit taken at Section 4—4 of FIG. 3 showing the guide pulley relationships.

Referring to FIG. 4, the number of drum revolutions in either direction can be adjusted by repositioning the belts. For clockwise (raise) rotation, the winch drum 102 would be rotated to the desired upper limit position, set screws and **37*a* would then be loosened and the left hand adjusting hub 5*c* turned counterclockwise until the raised portion of the belt lifts the poppet, this is signalled by air release down the poppet stem. Set screws 37 and 37*a* would then be tightened. For counterclockwise rotation, the procedure would be repeated using the right hand adjusting hub 5*b* loosening set screws 37*b* and 37*c*** and turning it clockwise.

Figure 3:
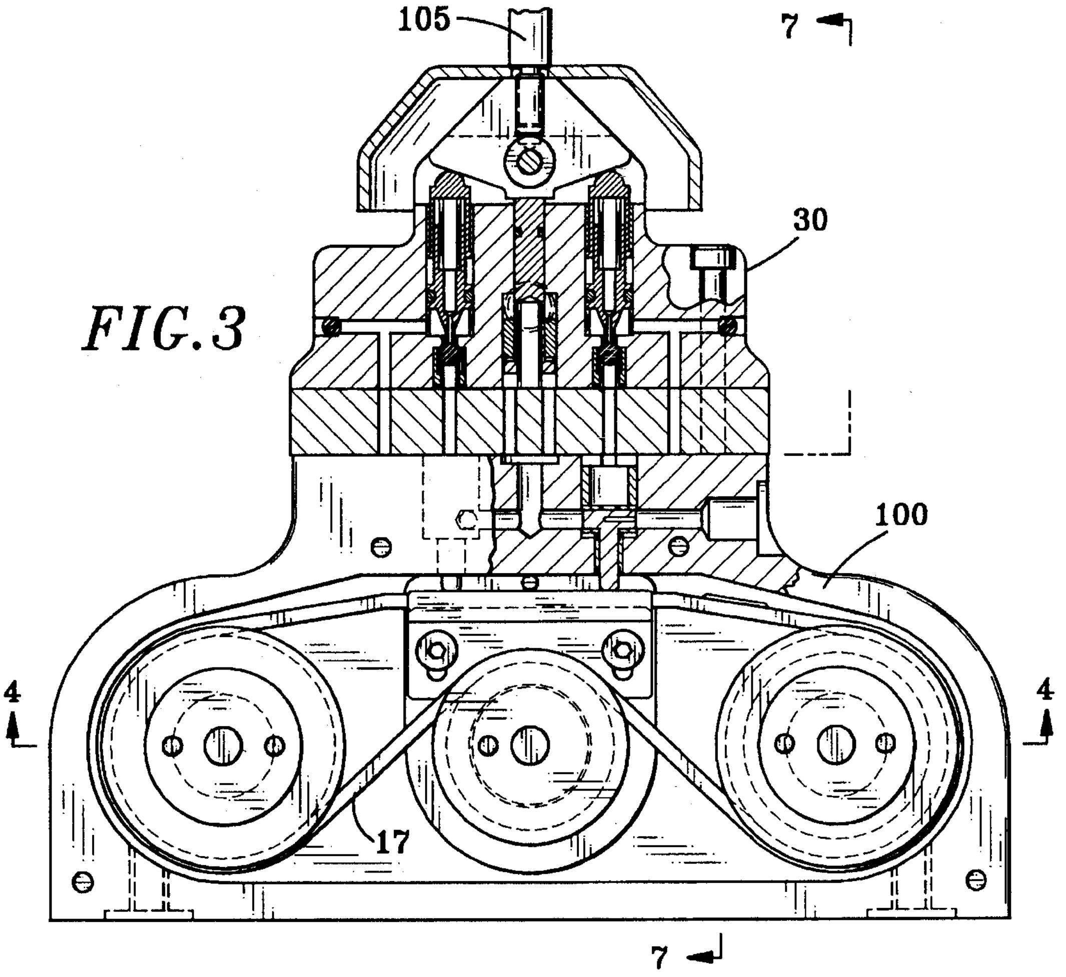
FIG. 3 is an internal cross sectional view of the control unit.

Referring generally to Drawing FIG. 3 and FIG. 4, the limit device and directional control assembly, it should now be understood by one skilled in the art that the present invention employs flexible toothed belts 17 and **17*a* having raised areas 27** which activate snap acting air valves to limit the raising and lowering points on an air driven winch. One belt is used for the upper limit control and one for the lower limit control. The snap acting air valves are incorporated into the limit device housing and these control the air supply to a directional pilot valve that is also mounted on the housing. This arrangement provides an efficient modular control package that minimizes external piping and fittings and enables simple installation, service and timing adjustment.

Like the cam device, the belts provide endless rotation; like the lead screw device, the belts provide part of the overall gear ratio. Since the belts are flexible, the shape of the housing can be tailored to suit the shape of other components on the winch. Also, they can be packaged into a housing less than half the size of the equivalent cam or lead screw. Unlike the cam or lead screw, the belts are free from backlash, impervious to contamination, and do not corrode. In a typical installation, the belts will reduce the required gear reduction to one third of that required by a cam device. This also reduces the backlash to one third and thus the minimum operating distance between limits to one third.

Pressure differential principles create an "over center" condition in the air valves in this device causing them to consistently snap open or close at the same actuation point. This greatly improves accuracy since, on a winch having a large amount of cable, the tracking movement of the belts is small when compared to the movement cable and even a small variation in the opening or closing point of an air valve can cause the preset limit to vary several feet.

Referring to FIGS. 4 and 6, toothed flexible timing belts 17 and 17*a* are mounted on toothed pulleys 5*a* and 5*b* and pass over tensioner pulleys 7*a* and 7*b* all carried inside housing 1. Belts 17 and 17*a* also pass over tensioning support guide 12 which is adjustably secured by screws 25 to housing 1. Belts 17 and 17*a* each have a 0.03 inch thick rubber strip forming a raised area 27 and 27*a* (not shown) bonded to the smooth side.

The right hand pulley assembly comprises adjustment hub 6, toothed pulley 5*a*, toothed pulley 5*b* and worm gear 11. Toothed pulley 5*a* and worm gear 11 are selectively free to rotate about adjustment hub 6 while toothed pulley 5*b* is permanently bonded to adjustment hub 6 to prevent any relative movement. When tightened, lock screws 37, clamp toothed pulley 5*a* and worm gear 11 against toothed pulley 5*b* and prevent rotation relative to adjustment hub 6. Adjustment hub 6 is mounted on pin 23 pressed into housing 1 and is free to rotate. The right hand pulley assembly is driven through worm gear 11 by worm 16 mounted on drive shaft 13 carried by bearing 18. Drive shaft 13 is driven through a spiral gear that is connected to the winch drum.

The left hand pulley assembly comprises hub 6*a*, toothed pulley 5*c*, toothed pulley 5*d* and spacer 10. Toothed pulley 5*d* and spacer 10 are free to rotate about adjustment hub 6*a*. Toothed pulley 5*c* is permanently bonded to hub 6*a* to prevent any relative movement. Hub 6*a* is mounted on pin 23*a* pressed into housing 1 and is free to rotate.

The center pulley assembly is used to adjust belt tension and also serves to maximize the belt length and comprises flanged pulleys 7*a* and 7*b* and spacer 9 free to rotate on shaft 8 but axially retained by retaining ring 29. Shaft 8 is eccentrically secured to housing 1 by screw 25 which when slackened, allows shaft 8 to pivot about screw 25 in an arc sufficient to slacken or tighten the belt.

Referring to FIGS. 3, 6, 8, and 9, the snap acting valve assembly comprises poppet assembly 3, sleeve 22 and poppet seat 4. Poppet assembly 3 comprises poppet 51, upper rubber face seal 2 and lower rubber face seal 2*a*. Poppet 51 has a crossed drilled hole 31 and a small diameter communicating orifice 32. Sleeve 22 is pressed into housing 1 and slidably locates poppet assembly 3 while also providing a sealing seat for lower face seal 2*a*. Poppet seat 4 is pressed into housing 1 so that it provides a sealing seat 33 a small distance above upper rubber face seal 2 on poppet assembly 3.

There are two identical snap acting valve assemblies or poppet assemblies right hand 3 and left hand 3*a* as described above located in housing 1 and staggered so that the rounded end of each poppet is positioned above the center of each belt. Poppet seat 4 has a center hole of sufficient diameter to provide full flow of air through it. Lower face seal 2*a* is smaller in diameter than upper face seal 2. Air under pressure enters housing 1 and is directed to the right hand and the left valve assemblies creating a pressurized chamber in which each poppet assembly 3 sits.

This pressure normally forces each poppet assembly downward towards the belts causing each lower face seal 2*a* to seal on their respective sleeve 22 seats thus preventing air leakage past poppet 51 stems. When air is flowing through poppet seat 4, a small force applied to the rounded end of the poppet causes the poppet to move away from the lower seat and approach the upper seat 4. This action initially reduces the downward force on the poppet since air pressure is now acting only on the stem area and not the lower seat area which is larger.

As the poppet 51 approaches the upper seat 4, it begins to restrict air flow through it causing a pressure drop above the poppet. The large difference between the area of poppet seat 4 and the area of the poppet stem causes this small pressure drop to suddenly unbalance the poppet forcing it against seat 4. This action cuts off to one side of the directional control valve assembly 30 all but a small supply of air which passes through the small diameter orifice 32 in poppet 51, through poppet seat 4, past open check ball 16 and through a bleed hole 36 positioned above in valve 30. If check ball 16 closes, this air is trapped causing pressure to build above and the poppet to snap back on to the lower seat.

Figure 2:
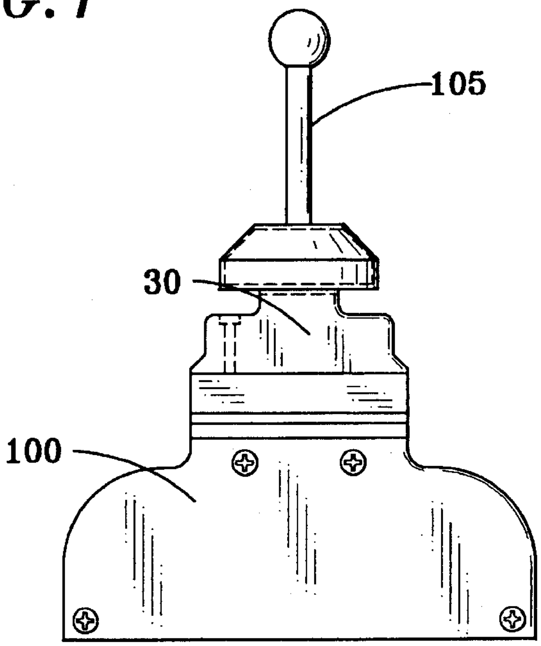
FIG. 2 is an external end view of a control unit according to the present invention showing its major component parts.
Figure 5:
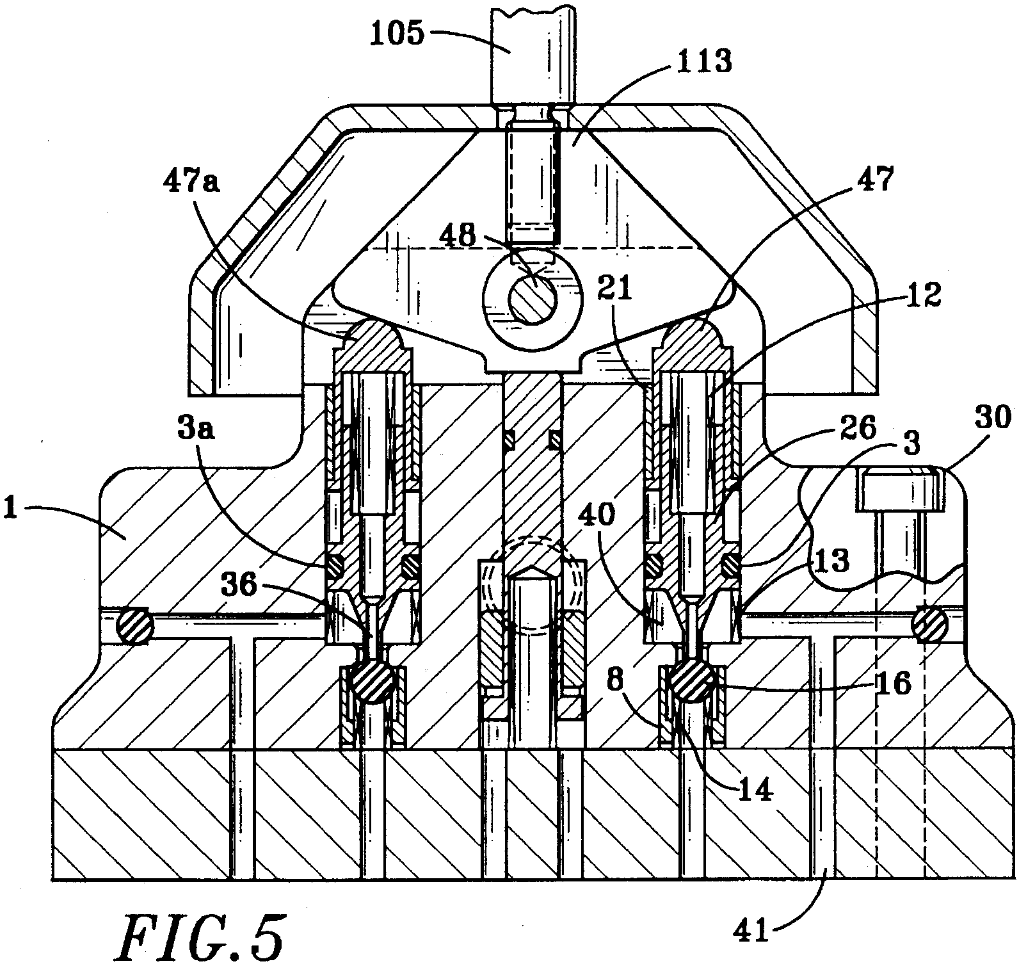
FIG. 5 is an expanded cross sectional view of the directional control valve.

Referring to FIG. 5 and FIG. 2, directional control valves assembly 30 and provides pressure regulated pilot air to control the amount and direction of spool movement on the winch motor control valve. The regulator assembly comprises a rubber check ball 16 which is guided by sleeve 8 and held against a seat in valve body or housing 1 by spring 14. Also piston 26 which is held in equilibrium by spring 13 acting against valve body 1 and spring 12 acting against plunger 47, which is flange retained by bearing 21 pressed into the valve body. Directional valve 30 comprises two identical assemblies as just described. Actuator 3 is rotated on pin 48 in valve body 1 by handle 105 and normally rests loosely on right and left hand plungers 47 and 47*a*. Slightly rotating actuator 3 clockwise depresses right hand plunger 47 a small amount which moves piston 26 downward by compressing high rate spring 12 against low rate spring 13 causing it to bottom out. Piston 26 has a tapered nose which contacts rubber check ball 16 sealing a small diameter bleed hole 36 at the center of piston 6 as the check ball is lifted. This permits air to flow into valve chamber 40 and out through channel 41 to one of the pilot chambers on the winch control valve. Pressure builds in chamber 40 and overcomes spring 12 by acting on piston 6 causing it to move back and partially close check ball 16. In this position a condition of equilibrium exists where the check ball will remain slightly open to maintain pressure and flow. Increasing the clockwise rotation of actuator 113 causes increased compression of spring 12 and thus raises the pressure in chamber 41. Decreasing the clockwise rotation of actuator 113 will reduce compression on spring 12 causing air pressure in chamber 41 to momentarily push piston 6 back away from check ball 16 allowing air to escape down the center hole in piston 6 until the pressure stabilizes at a lower value to match the reduced compression on spring 12. Rotation of actuator 113 counterclockwise beyond its normal center position will produce exactly the same results in the opposite pilot channel of the winch control valve.

What is claimed is:

1. A directional control assembly for controlling operation of a motive device within adjustable limits comprising:

a continuous belt driven in direct proportion to operation of said device;

means for positioning said belt relative to a determined position of said device; and means on said belt for establishing a signal indicative of said determined position of said device.

2. A directional control assembly according to claim 1, wherein said means for establishing a signal further comprises a discontinuity of said endless belt.

3. A directional control assembly according to claim 2, wherein said control assembly further includes a control valve, said discontinuity further comprises means for activating said control valve for said device.

4. A directional control assembly according to claim 3, wherein said discontinuity comprises a raised portion of said continuous belt.

5. A directional control assembly according to claim 4, wherein said control assembly further includes a snap action poppet valve, and said raised portion operatively displaces said snap action poppet valve.

6. A directional control assembly according to claim 1, wherein said continuous belt comprises an endless flexible cog driven belt.

7. A directional control assembly according to claim 1, wherein said continuous belt is a rubber cog belt having a raised projection on an outside surface.

8. A directional control assembly according to claim 7, wherein said continuous belt is mounted on and driven by a cog wheel mounted on a shaft.

9. A directional control assembly according to claim 8, wherein said cog wheel is adjustable in rotary position relative to said shaft.

10. A directional control assembly according to claim 8, wherein said motive device further comprises a winch including a winch drum and said shaft is driven by a gear drive in proportion to the rotation of said winch drum.

11. A directional control assembly for controlling operation of a winch within adjustable limits comprising:

a continuous belt driven in direct proportion to operation of said device;

means for positioning said belt relative to a determined position of said device; and means on said belt for establishing a signal indicative of said determined position of said device.

12. A directional control assembly for a winch according to claim 11, wherein said continuous belt is provided with a discontinuity and said discontinuity comprises means for activating a control valve.

13. A directional control assembly according to claim 11, wherein said directional control assembly for said winch further comprises a directional pilot control valve including a resettable snap action shut off feature activated by said endless belt.

* * * * *